United States Patent
Ziny

(10) Patent No.: US 11,037,253 B2
(45) Date of Patent: Jun. 15, 2021

(54) APPARATUS AND METHOD OF MANAGING 2D DOCUMENTS FOR LARGE-SCALE CAPITAL PROJECTS

(71) Applicant: Hexagon Technology Center GmbH, Heerbrugg (CH)

(72) Inventor: Gil Ziny, Motzkin (IL)

(73) Assignee: Hexagon Technology Center GmbH, Heerbrugg (CH)

( * ) Notice: Subject to any disclaimer, the term of this patent is extended or adjusted under 35 U.S.C. 154(b) by 509 days.

(21) Appl. No.: 15/089,921

(22) Filed: Apr. 4, 2016

(65) Prior Publication Data
US 2017/0287084 A1 Oct. 5, 2017

(51) Int. Cl.
*G06Q 50/08* (2012.01)
*G06F 16/93* (2019.01)
*G06F 16/28* (2019.01)
*G06Q 10/06* (2012.01)

(52) U.S. Cl.
CPC .......... *G06Q 50/08* (2013.01); *G06F 16/288* (2019.01); *G06F 16/93* (2019.01); *G06Q 10/06* (2013.01)

(58) Field of Classification Search
None
See application file for complete search history.

(56) References Cited

U.S. PATENT DOCUMENTS

| | | | |
|---|---|---|---|
| 5,276,877 A | 1/1994 | Friedrich et al. | 395/650 |
| 5,555,354 A | 9/1996 | Strasnick et al. | 395/127 |
| 6,144,973 A * | 11/2000 | Fujii | G06F 16/957 |
| | | | 715/222 |
| 7,058,648 B1 * | 6/2006 | Lightfoot | G06F 21/6218 |
| 7,139,974 B1 * | 11/2006 | Bascom | G06F 16/288 |
| | | | 715/236 |
| 7,290,224 B2 | 10/2007 | Byrn et al. | 716/1 |
| 7,519,238 B2 | 4/2009 | Robertson et al. | 382/305 |
| 8,090,736 B1 * | 1/2012 | Knapp | G06Q 20/208 |
| | | | 707/760 |

(Continued)

OTHER PUBLICATIONS

International Searching Authority, International Search Report—International Application No. PCT/US2017/025733, dated May 23, 2017, together with the Written Opinion of the International Searching Authority, 14 pages.

*Primary Examiner* — Christopher J Raab
(74) *Attorney, Agent, or Firm* — Nutter McClennen & Fish LLP

(57) ABSTRACT

An apparatus and/or method of managing a large capital project obtains access to 2D capital project documents ("2D documents") produced using project data generated by a 3D design program. The documents are logically related through a hierarchy that is defined by a plurality of attribute based rules. Next, the method and/or apparatus access a given 2D document. Like others, the given 2D document has a specific given attribute and is in a given hierarchical level. The method and/or apparatus then applies at least one of the attribute based rules to the given attribute of the given 2D document, and determines, as a function of applying that attribute based rule, which different 2D document in the plurality of 2D documents in another hierarchical level to access. The method and/or apparatus accordingly accesses the different 2D document as a function of the application of the noted attribute based rule to given attribute.

27 Claims, 16 Drawing Sheets

(56) References Cited

U.S. PATENT DOCUMENTS

| | | | | |
|---|---|---|---|---|
| 8,204,809 | B1* | 6/2012 | Wise | G06Q 40/06 |
| | | | | 705/35 |
| 9,182,948 | B1 | 11/2015 | O'Riordan | 715/711 |
| 2002/0078014 | A1* | 6/2002 | Pallmann | G06F 16/951 |
| 2004/0225968 | A1* | 11/2004 | Look | G06F 3/0481 |
| | | | | 715/778 |
| 2006/0112108 | A1* | 5/2006 | Eklund | G06F 17/3071 |
| 2006/0167929 | A1* | 7/2006 | Chakraborty | G06F 17/2205 |
| 2007/0171223 | A1 | 7/2007 | McArdle et al. | 345/420 |
| 2007/0208840 | A1 | 9/2007 | McConville et al. | 709/223 |
| 2008/0036761 | A1 | 2/2008 | Mazzanti | 345/420 |
| 2009/0150774 | A1* | 6/2009 | Gile | G06F 16/907 |
| | | | | 715/700 |
| 2012/0324357 | A1 | 12/2012 | Viegers et al. | 715/730 |
| 2013/0047135 | A1* | 2/2013 | Joshi | G06F 8/30 |
| | | | | 717/120 |

\* cited by examiner

APPARATUS AND METHOD OF MANAGING 2D DOCUMENTS FOR LARGE-SCALE CAPITAL PROJECTS

FIELD OF THE INVENTION

The invention generally relates to managing large-scale capital projects and, more particularly, the invention relates to managing 2D documents produced by 3D design programs used to produce capital projects.

BACKGROUND OF THE INVENTION

Development, construction, and management of large-scale capital projects, such as power plants (e.g., a coal fueled power generation facility), capital ships (e.g., military shipping, cruise ships, or cargo ships), and off-shore oil platforms, requires coordination of processes and data on a scale that is orders of magnitude greater than those of smaller, common projects (e.g., building and selling a ten room house). Large-scale capital projects consequently often require a substantially more comprehensive production and management solution.

In response to this need, those skilled in the art have developed comprehensive 3D design programs (e.g., SmartPlant® Enterprise, distributed by Intergraph, Inc. of Huntsville, Ala., also referred to as "plant design programs") that are specially configured for the rigors of such large capital projects. Among other things, this type of design program can be implemented as a broad application suite that manages most or all phases of a large-scale capital project, from initial conception, to design, construction, handover, maintenance, management, and decommissioning.

During use, 3D design programs generate 3D representations of objects within the project, such as plumbing components (e.g., valves and pipes) and electrical components (e.g., switches and wires). To facilitate processing, the 3D design program also often generates those representations of objects in the form of a 2D document, such as 2D schematic drawings of plumbing or electrical components. These 2D documents often are interrelated. For example, an electrical system may show certain modules on a first 2D document. Those modules may have circuit breaker boxes shown on a second 2D document, while a third 2D document may show circuit breakers that are within the circuit breaker box. Those documents, however, are not well coordinated after they are generated. Specifically, after they are generated, the relationships between components in different 2D documents for a single project often are lost, thus causing substantial inefficiencies in the large-scale capital project.

SUMMARY OF VARIOUS EMBODIMENTS

In accordance with one embodiment of the invention, an apparatus and/or method of managing a large capital project obtains access to a plurality of 2D capital project documents ("2D documents") that were produced using project data generated by a 3D design program. The plurality of 2D documents are logically related through a hierarchy that at least in part is defined by a plurality of attribute based rules, and the 2D documents represent a physical aspect of the capital project. Next, the method and/or apparatus access a given 2D document of the plurality of 2D documents. Like others, the given 2D document has a specific given attribute and is in a given hierarchical level. For example, this specific given attribute may be based on one or more different components in the given 2D document (e.g., a user could hover over one such component), or on the entire given 2D document itself. The method and/or apparatus then applies at least one of the attribute based rules to the given attribute of the given 2D document, and determines, as a function of applying that attribute based rule, which different 2D document in the plurality of 2D documents in another hierarchical level to access. For example, the method and/or apparatus may apply the attribute based rule to an attribute of one component in the given 2D document. The method and/or apparatus accordingly accesses the different 2D document as a function of the application of the noted attribute based rule to given attribute.

In illustrative embodiments, the set of attribute based rules dynamically changes the hierarchy of the given document if the at least one associated given attribute changes. For example, the attribute based rules may be configured so that if the at least one given attribute is a first attribute, then the different document is a first document of the plurality of 2D documents. If, however, the given attribute is a second attribute that is different from the first attribute, then the different document is a second document (i.e., different from the first 2D document) of the plurality of 2D documents.

The method and/or apparatus may access the given 2D document in a number of different ways. For example, the method and/or apparatus may display the given 2D document on a display device, or print out the given document via a printer. In either case, the given 2D document may have shadow indicia outlining at least a portion of indicia of a next level component in a 2D document of another hierarchical level. Among other things, the plurality of 2D documents includes one or more of schematics, spreadsheets, drawings, reports, and manuals.

If the given 2D document has a plurality of given attributes, then the method and/or apparatus may apply the attribute based rules to the plurality of given attributes. For example, the method and/or apparatus may use a formulaic approach in which the plurality of attributes are variables in the formula.

The attributes may be related to portions of the 2D document, or the entire 2D document. For example, the given 2D document may include first indicia representing a first given component of the capital project, and the given attribute may be related to the first given component—not another component or the entire document. As another example, the given 2D document may include first indicia representing a first given component of the capital project, and second indicia representing a second given component of the capital project. Depending on which indicia is applied, the given attribute may be related to the first given component or the second given component. In this case, the different 2D document may be one of 1) a first different 2D document if the first given component is applied to the rules, or 2) a second different 2D document if the second given component is applied to the rules. Like the prior example, the first different 2D document and second different 2D document are not the same 2D document.

The given attribute may be configured to be changeable during the lifespan of a large-scale capital project. Accordingly, when changed, the method and/or apparatus may update an attribute database associated with one or both the plurality of 2D documents and the 3D design program to maintain updated information across the project. Moreover, in some embodiments, the method may transform a physical component represented in one of the 2D documents in the hierarchy after accessing the given 2D document. For example, the user may direct a construction team to modify a circuit breaker of an electrical system.

In accordance with another embodiment of the invention, an apparatus manages a large capital project having project data (from a 3D design program) used to generate a plurality of 2D capital project documents ("2D documents"). To that end, the apparatus has an interface to access the plurality of 2D documents. As with other embodiments, the plurality of documents are logically related through a hierarchy that at least in part is defined by a plurality of attribute based rules. The apparatus also has a viewer operably coupled with the interface. The viewer is configured to access a given 2D document of the plurality of 2D documents, where the given 2D document has a given attribute and is in a given hierarchical level. Finally, the apparatus has a rules module operatively coupled with the viewer. The rules module is configured to apply at least one of the attribute based rules to the given attribute. The rules module also is configured to determine, as a function of applying the at least one attribute based rule, which different 2D document in the plurality of 2D documents in another hierarchical level to access. Using this result of the rules module, the viewer thus is configured to access the different 2D document as a function of the application of the at least one attribute based rule to given attribute.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Illustrative embodiments maintain critical relationships between 2D documents generated by a 3D design program used for a large-scale capital project. To that end, a document manager maintains a rules-based hierarchy that logically connects 2D documents as a function of one or more of their attributes (e.g., attributes of one or more selected components in the 2D documents, or the entire 2D document). Accordingly, system users may more easily view and update relevant 2D documents of the large-scale capital project. Details of illustrative embodiments are discussed below.

Figure 1:
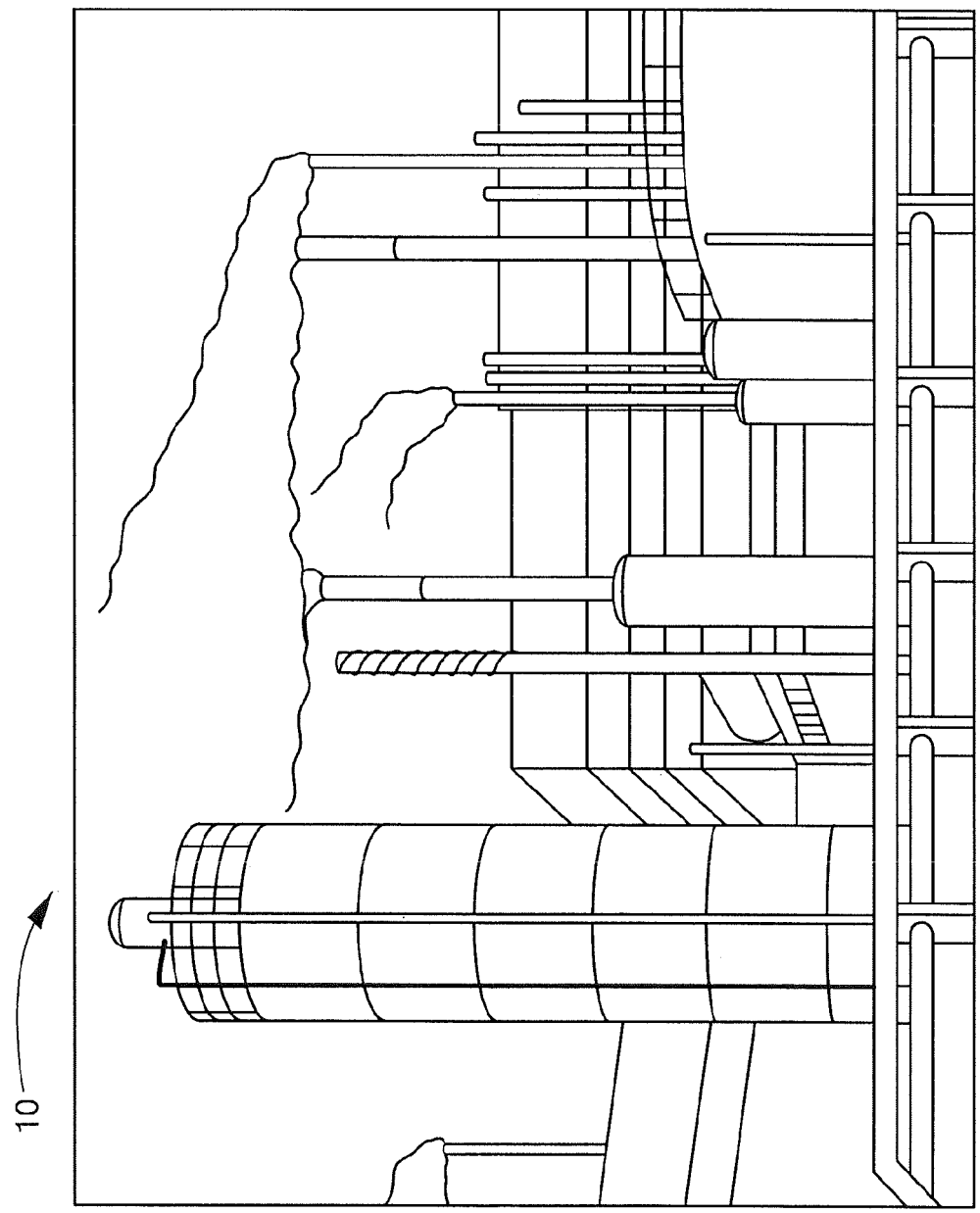
FIG. 1 shows a large-scale capital project that may use illustrative embodiments of the invention.

FIG. 1 generally shows one example of a large-scale capital project 10 (or more generally a "capital project 10") that may implement illustrative embodiments of the invention. More specifically, as known by those skilled in the art, a capital project 10 generally is a long-term investment made to build, augment, add, or improve on a highly capital intensive project—it requires notable amounts of both financial capital and labor capital to undertake, and often takes years to complete. Capital projects 10 are often defined by their large-scale cost relative to other investments requiring less planning and resources (e.g., building a house or a truck). Both the private sector and public sector can be involved in a capital project 10. Some examples of capital projects includes developing and maintaining roads, railways, power plants, ships, offshore oil platforms, dams, and factories.

The capital project 10 shown in FIG. 1 is a power plant, which, as known by those skilled in the art, has an enormous number of different components that cooperate to accomplish its function of generating power. For example, among other things, the power plant of this figure has a plurality of large and small buildings, smokestacks, pipes, valves, fuel tanks, ladders, and electrical systems. Indeed, designing, building, and maintaining such a project requires vast amounts of planning and coordination. Without careful planning and coordination, the power plant may never have been built or operated.

To that end, those skilled in the art have developed 3D design programs/products ("3D design programs 12," FIG. 2, also known as "plant design programs") to assist in planning/designing, developing, maintaining, and decommissioning capital projects 10, such as that shown in FIG. 1. As noted above, one such widely used 3D design program 12 is known as the SmartPlant® Enterprise product (hereinafter "SmartPlant® product"), distributed by Intergraph, Inc. of Huntsville, Ala. In a manner similar to other such products, the SmartPlant® product has at least the following interrelated functions and components:

3D modeling and visualization,
engineering and schematics,
information management, procurement, fabrication, and construction, open integration with other proprietary and open systems.

Accordingly, among other people, designers, engineers, developers, and managers use these and other features of 3D design programs 12, such as the SmartPlant® product, to design, update, manage, and decommission capital projects 10, such as the power plant shown in FIG. 1. During use, a 3D design program 12 generates many detailed 3D representations of components in the capital project 10. For example, a 3D design program 12 may generate detailed 3D renderings of pipe systems within the power plant of FIG. 1. To accomplish some function, a user may manipulate or modify the 3D renderings of specific components of the pipe system, such as valves and brackets. For example, a user may render a 3D representation of the noted pipe bracket on a display device, rotate it to determine or confirm certain properties, and modify certain of its attributes.

Figure 2:
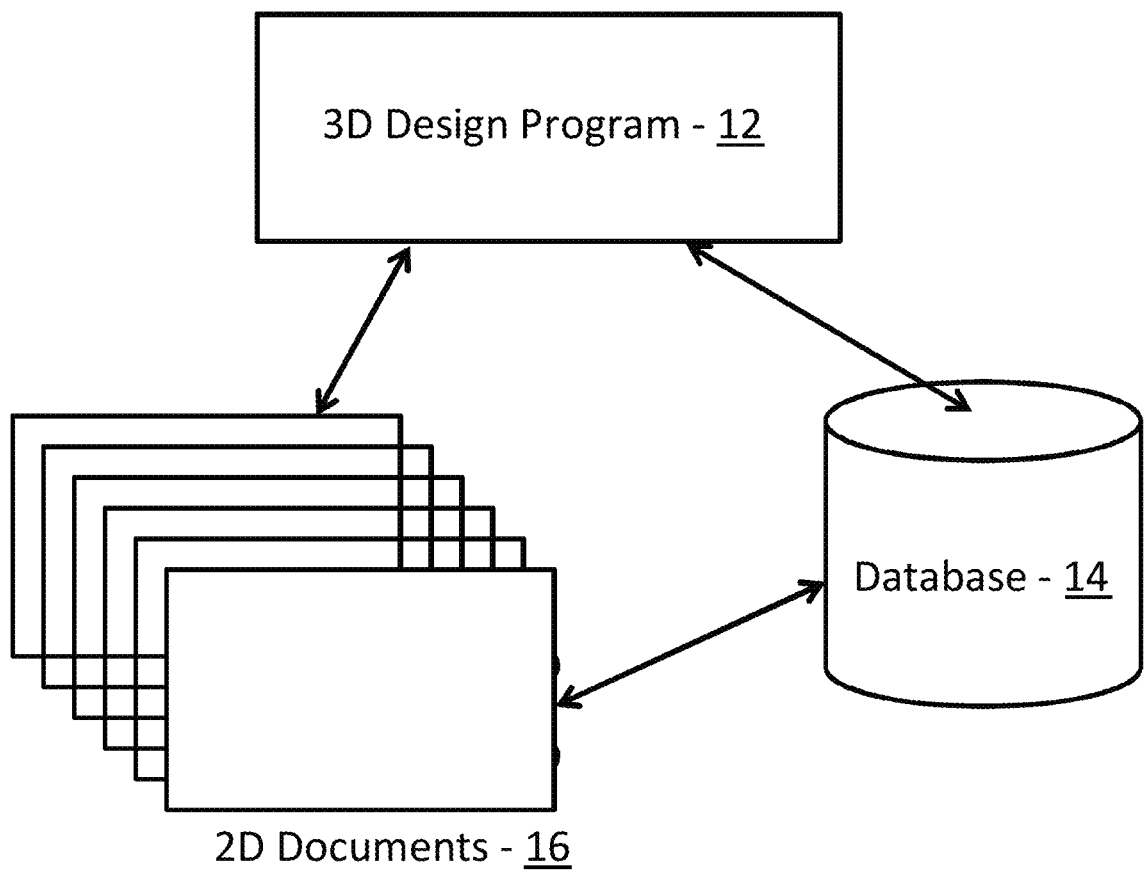
FIG. 2 schematically shows the interaction of a 3D design program, a plurality of 2D documents it produces, and its database for maintaining data relating to large-scale capital projects.

FIG. 2 schematically shows a high-level block diagram of a 3D design program 12, such as the SmartPlant® product, and a database 14 (e.g., a model database) containing the attributes of the various components in the capital project 10 it manages. Specifically, the data relating to the various systems and components of the capital project 10 are stored in the database 14. For example, a pipe bracket of the power plant shown in FIG. 1 may have a number of various attributes, such as its shape, topology, geometry, dimensions, materials, etc. Each of those attributes is stored in the database 14 and, at any given time, may be considered to have a specific "state." In other words, the state of the component, such a pipe bracket, is defined by the attributes in this database 14 at a given time. Accordingly, a user and/or logic may access those attributes for any of a number of purposes, such as to produce a visual display of the bracket, or to modify the bracket. Thus, a user may modify the state of the component by modifying its attributes. As a part of a 3D design program 12, the database 14 has a complete 360 degree data set of information relating to many of these components and systems—e.g., so they can be rotated on a display device and managed in a plurality of orientations.

In addition to generating 3D representations of various components, the 3D design program 12 often generates and/or maintains 2D documents (identified by reference number 16) related to the components of the capital project 10. Specifically, these 2D documents 16 may have information sufficient for visually representing a component or system in two dimensions only—but not in three dimensions. For example, a user may generate a plurality of 2D documents 16 related to a computer cabinet inside of the power plant in FIG. 1. Each 2D document 16 may show some aspect of that computer cabinet from a specified point of view. As discussed in greater detail below, this example may include a plurality of 2D drawings showing various levels of the cabinet.

2D documents 16, however, are not limited to drawings. In addition to drawings, 2D documents 16 also may include other files or documents that are not primarily configured to display a visual image of the component or system itself. For example, 2D documents 16 also may include manuals (e.g., a manual for a pump system from a manufacturer), spreadsheets (e.g., containing lists of suppliers, costs, etc.), schematic drawings in perspective or isometric views, reports, and similar logical and physical constructs that, when rendered or visualized, are configured not to enable 3D rotation or similar capabilities as known by those in the art.

FIG. 2 schematically thus also schematically shows a plurality of 2D documents 16, which also communicates with the database 14 and the 3D design program 12. In illustrative embodiments, each one of the 2D documents 16 is a representation of a logical structure that acts as a logical container for a plurality of objects/components—a logical container with a list of all the components in the 2D document 16. For example, a certain 2D document 16 may show a pipe and valves. In that case, the pipe is one component while each valve is another component. The pipe and valves thus effectively are listed as components within the logical container of the 2D document 16. Logic thus may access the 2D document 16 to access the database 14 and render its components on a display device. Accordingly, the database 14 maintains and serves as the central repository of all components and their attributes, which, among other ways, are accessible through the 2D documents 16.

A change to one of the 2D documents 16 therefore preferably produces a corresponding change to the attribute data in the database 14. In so doing, the entire model in both the 3D logical space and the 2D logical space maintain their consistency. For example, using one or more of the 2D documents 16, a user may modify the voltage capacity of a circuit breaker from a low voltage to a high voltage. As such, the information in the database 14 relating to that circuit breaker is effectively updated to reflect that the circuit breaker has a new voltage capacity; namely, the new high voltage. Subsequent processing of that circuit breaker, whether using the 2D documents 16, 3D documents, or other means, thus should reflect this new high voltage capacity.

Figure 3A:
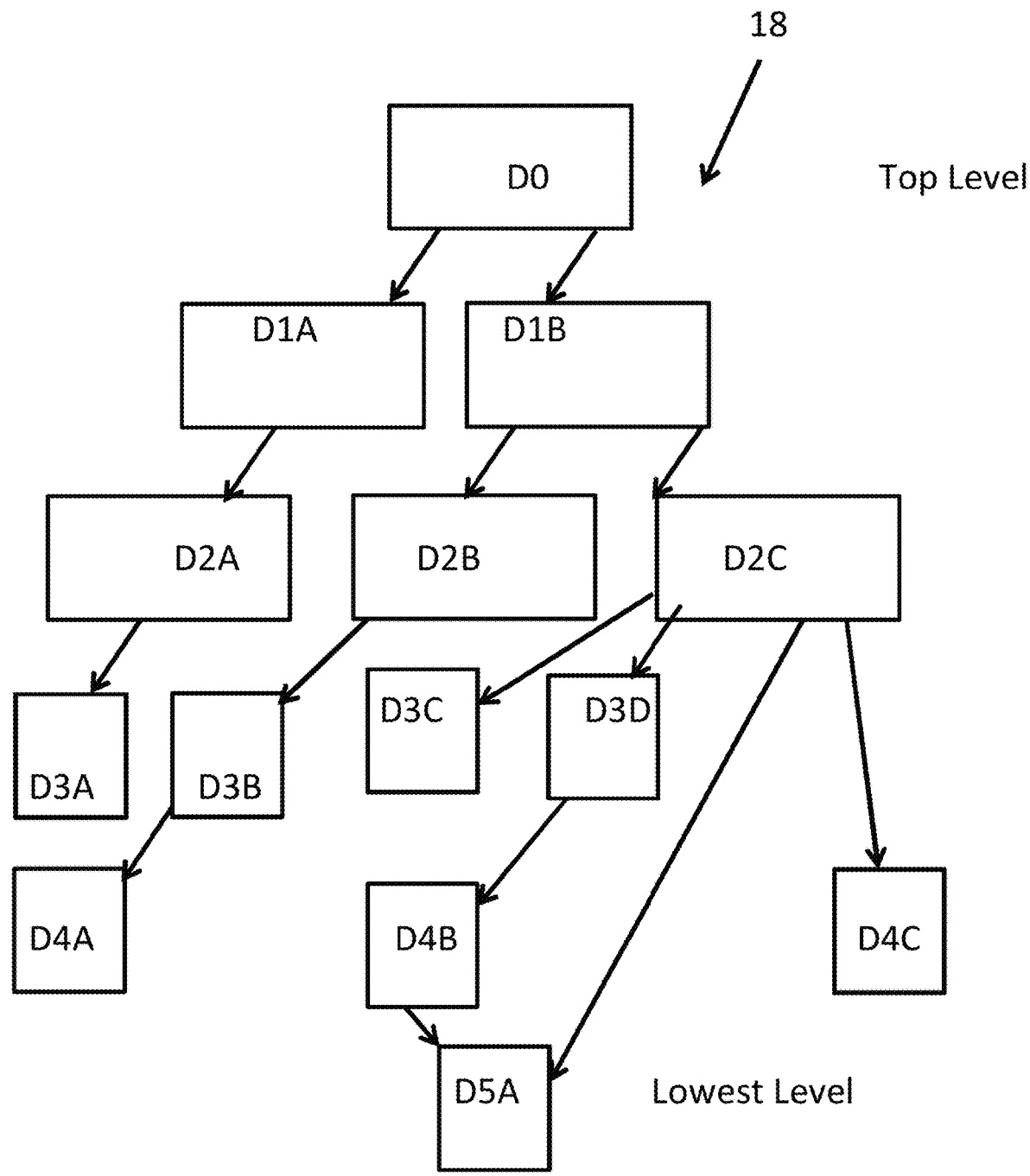
FIG. 3A schematically shows a first hierarchy of 2D documents that may be used with illustrative embodiments of the invention.

In illustrative embodiments, by their nature, sets of the 2D documents 16 have an inherent dynamic hierarchical relationship with other 2D documents 16. For example, one of the 2D documents 16 may show a top level view of a specific component in the 2D document 16, while a second level 2D document 16 may show a second, lower level view of the same component, and a third level 2D document 16 may show a third, lower level of the same component, etc. FIG. 3A schematically shows a simplified example of this relationship between a plurality of 2D documents 16 having this component/rules based hierarchy. It should be noted that although single arrows are shown (pointing toward lower levels), those skilled in the art should understand that some of the document relationships may be bi-directional. Accordingly, use of single sided arrows is for simplicity purposes only.

As shown, FIG. 3A schematically shows an exemplary and simple 2D document hierarchy 18 having a top-level 2D document "D0" (Level 0), with a plurality of other 2D documents 16 in five other hierarchical levels. Each of the 2D documents 16 may be related to one or a plurality of other 2D documents 16 and other hierarchical levels. For example, top-level Document D0 of Level 0 is related to two next level 2D documents 16 in Level 1—Documents D1A and D1B. In contrast, Document D1A, however, is related only to one other 2D document 16, Document 2DA. As another example, Document D2C is related to three 2D documents 16 that each are on different levels: Document D3D on Level 3, Document D4C on Level 4, and Document D5A on Level 5. Accordingly, some 2D documents 16 may skip levels. In alternative embodiments, some 2D documents 16 also have relationships with other 2D documents 16 on the same level.

As noted above and discussed in greater detail below, the relationships between the different 2D documents 16 are configured based upon a set of attribute based rules. These rules, which may be manually or automatically configured, are dependent upon one or more attributes associated with each 2D document 16 in the hierarchy 18. Specifically, the 2D document 16 may have one or more attributes (or characteristics) as a whole, and/or one or more attributes for various systems and components it represents. Each of these attributes may be stored in the database 14.

For example, among other things, the 2D document 16 as a whole may have attributes such as the overall power plant system to which it applies, the version number of the 2D document 16, the manufacturer of the system or components represented in the 2D document 16, the type of 2D document 16, the user who is responsible for managing the 2D document 16, etc. In a corresponding manner, attributes relating to one or more various systems or components in the 2D document 16 may include, among other things, the manufacturer of the specific component, the type of component, or other specific attribute of the component. For example, attributes of the prior noted circuit breaker may include its voltage rating, current rating, manufacturer, and location within the power plant.

To illustrate the hierarchy of FIG. 3A, consider 2D document D0 as having two components in its logical container. If a user selects, hovers, or zooms over one of two components (selection etc. discussed in greater detail below with regard to FIG. 7), the next document in the next level may be 2D document D1A. Conversely, if a user selects, hovers, or zooms over the other component in 2D document D0, then the next 2D document 16 in the hierarchy may be 2D document D1B. Further, as noted above, the 2D document D0 as a whole may have attributes that relate it to other 2D documents 16 (e.g., the user may not select, hover, or zoom over one specific component in 2D document D0). Although FIG. 3A does not show other arrows to other 2D documents 16, the 2D document D0 may have an aggregate document attribute that relates it with another document in another level, such as 2D document D2C, or again to 2D document D1A.

Figure 3B:
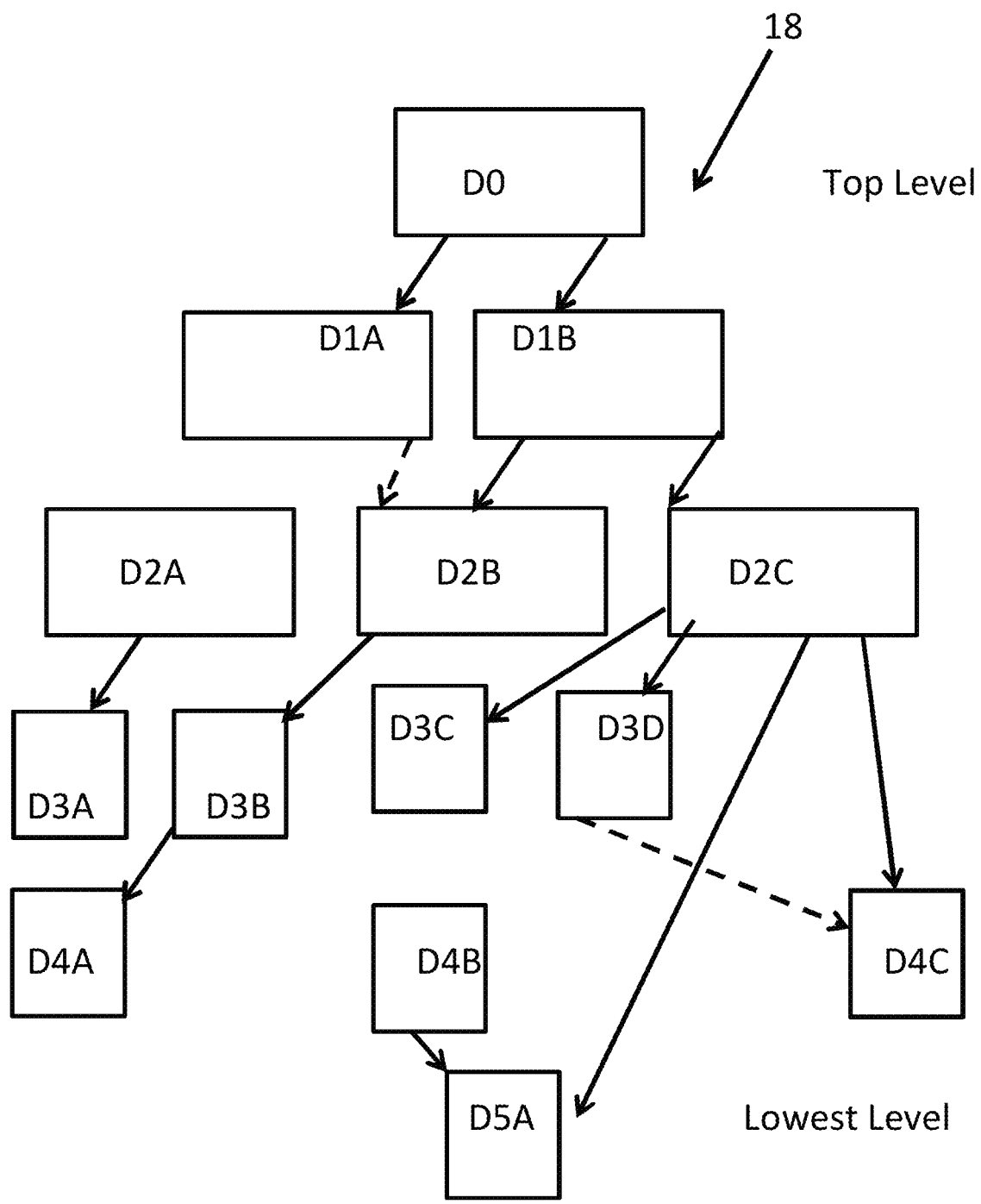
FIG. 3B schematically shows a second hierarchy of 2D documents formed by changing attributes of documents in the first hierarchy in accordance with illustrative embodiments of the invention.

As noted above, logic or users may change many of the attributes of the 2D document 16. Because illustrative embodiments apply rules to the attributes to determine 2D document relationships, such attribute changes correspondingly may change the relationship between a given 2D document 16 and other 2D documents 16 in its hierarchy 18. FIG. 3B generically shows a schematic view of the result of some such attribute changes and various 2D documents 16, where the dashed arrows represent a change in 2D document relationships from those in FIG. 3A. In this figure, attributes of Documents D1A and D3D where changed, causing changes to relate those documents respectively to Documents D2B and D4C. In addition to these changes, other 2D documents 16 in the hierarchy 18 may have had attribute changes that did not produce relationship changes with other 2D documents 16.

FIGS. 4A-4F graphically illustrate an example of six 2D documents 16 that are logically related in a hierarchy 18, such as that shown in FIGS. 3A and 3B. In this example, the top level 2D document 16 of the hierarchy 18 shows a computer cabinet containing various subsystems. Accordingly, the 2D document 16 in FIG. 4A has visual indicia representing the computer cabinet as a whole. In this case, the visual indicia is a solid rectangle. In accordance with illustrative embodiments of the invention, this 2D document 16 also includes shadow visual indicia representing components in one or more other hierarchical levels of related 2D documents 16.

Figure 4A:
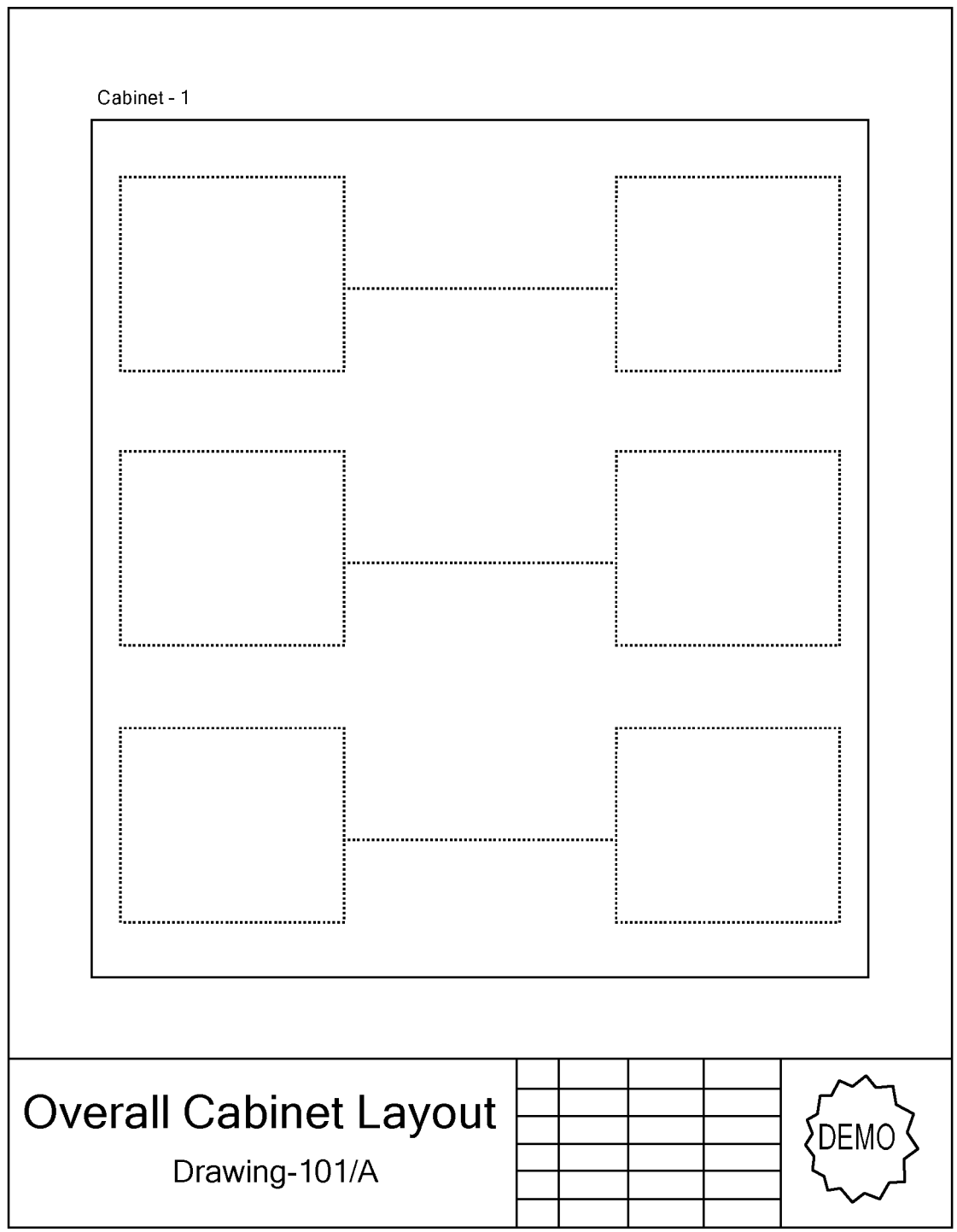
FIG. 4A schematically shows an example of a 2D document at a first, top hierarchical level.
Figure 4B:
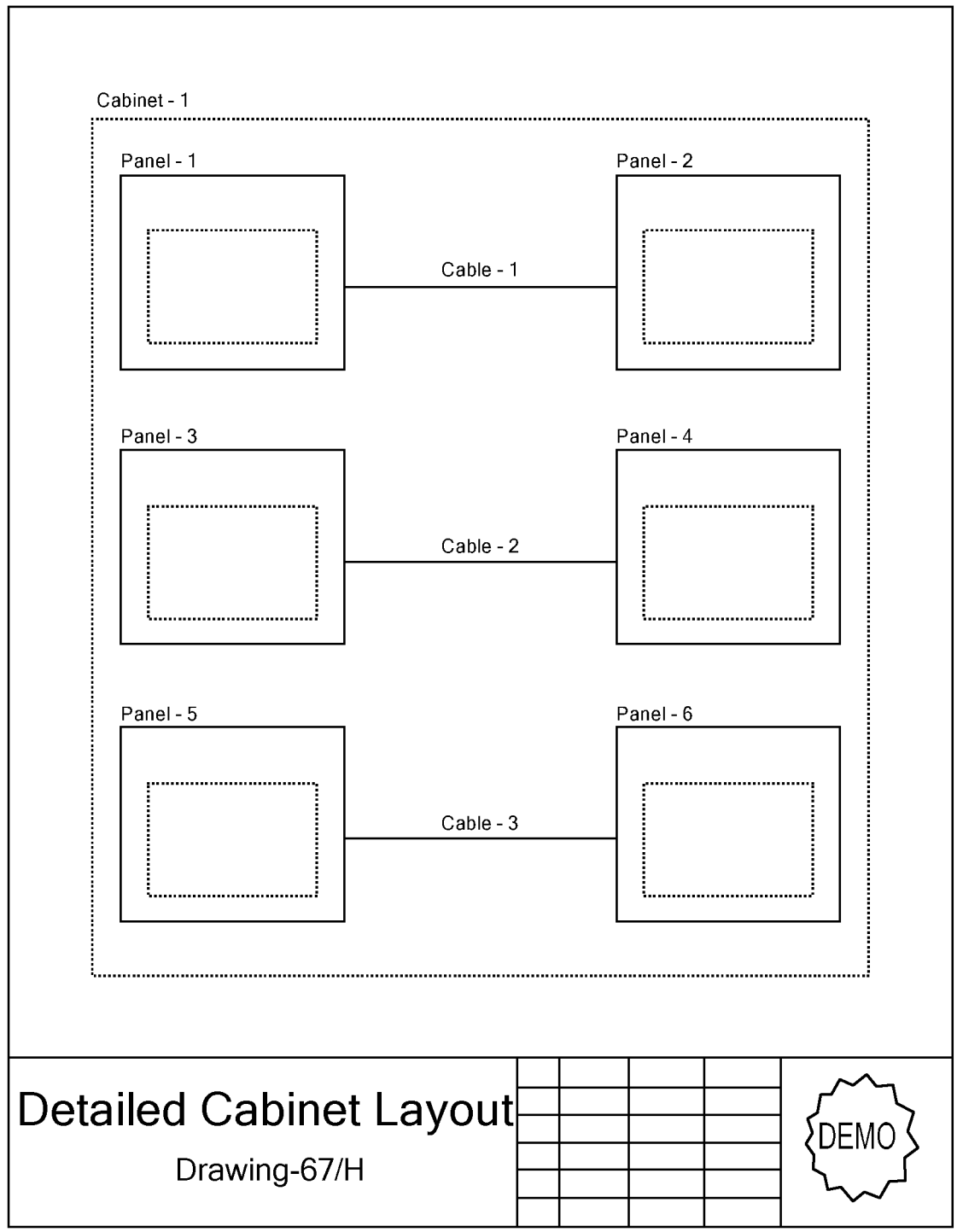
FIG. 4B schematically shows an example of a 2D document at a second hierarchical level that is beneath the first hierarchical level.
Figure 4C:
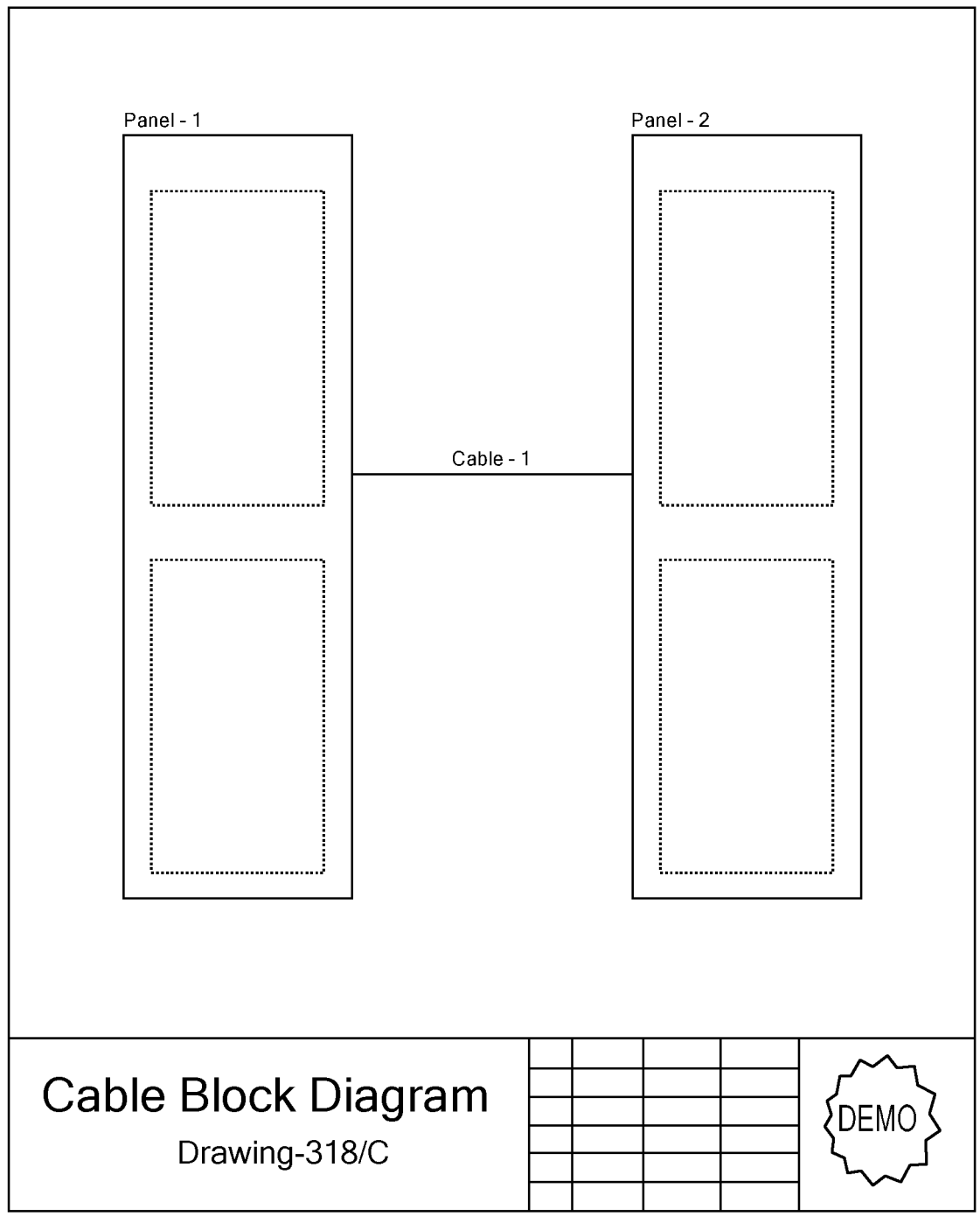
FIG. 4C schematically shows an example of a 2D document at a third hierarchical level that is beneath the second hierarchical level.
Figure 4D:
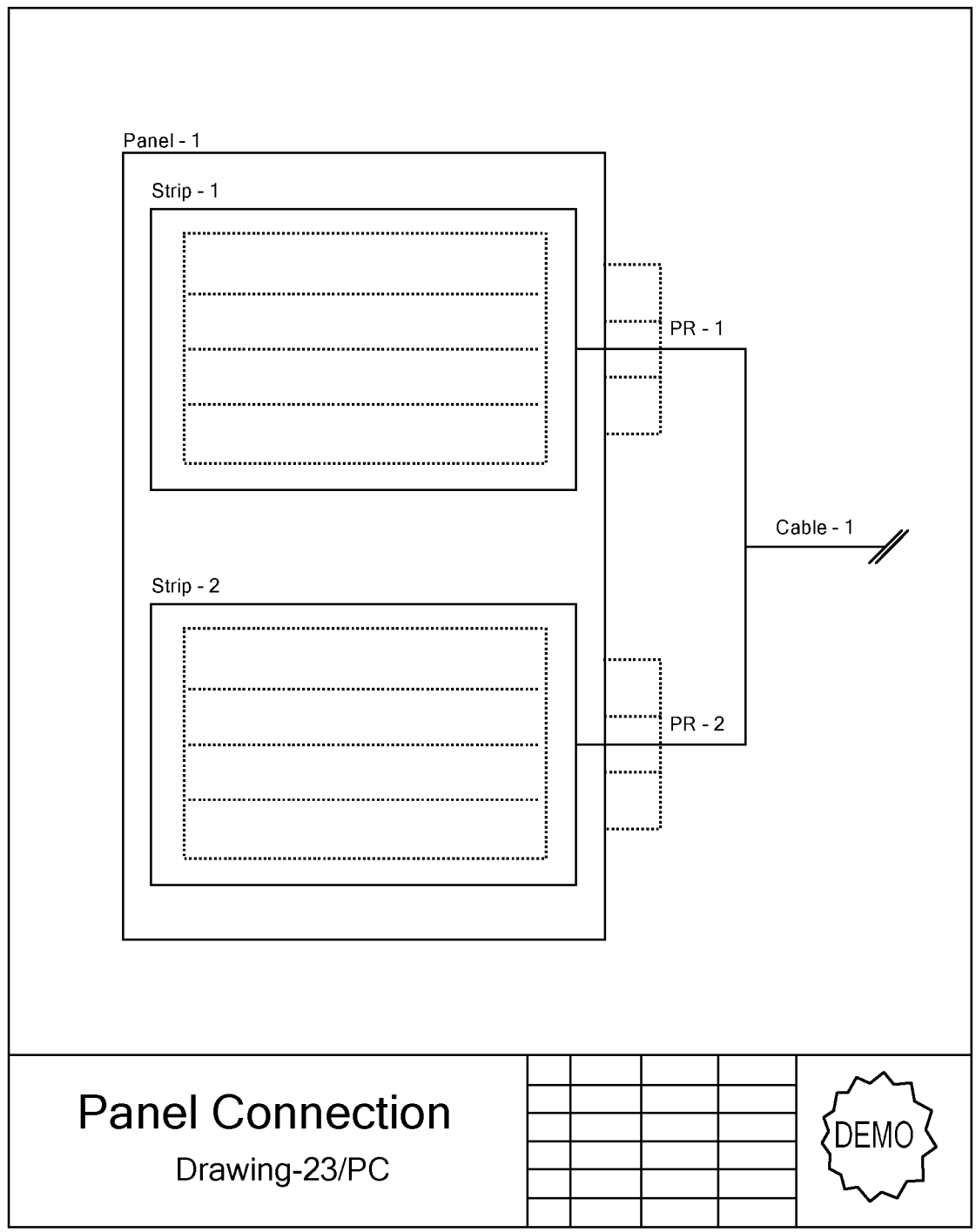
FIG. 4D schematically shows an example of a 2D document at a fourth hierarchical level that is beneath the third hierarchical level.
Figure 4E:
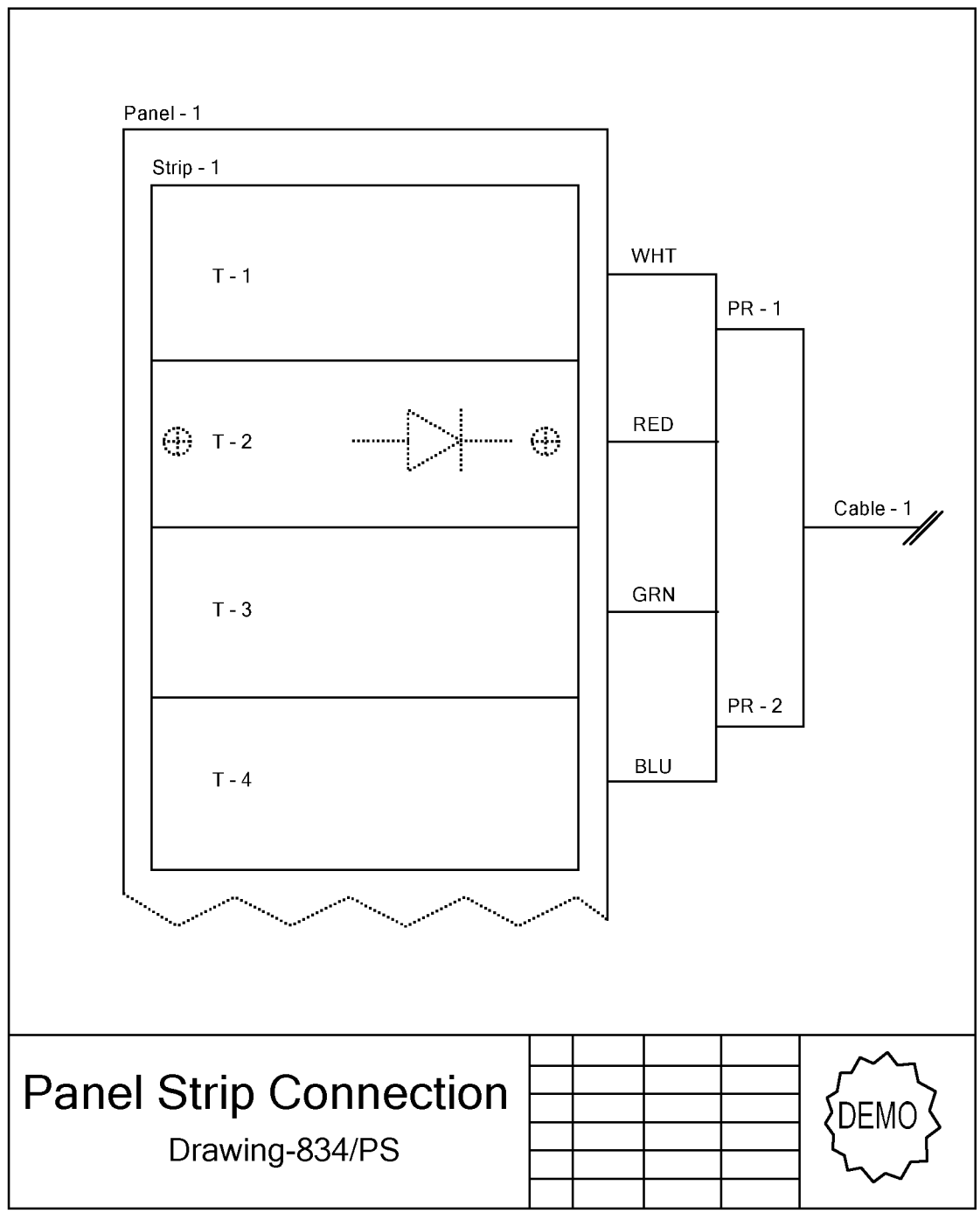
FIG. 4E schematically shows an example of a 2D document at a fifth hierarchical level that is beneath the fourth hierarchical level.

For example, as shown, such other-level 2D document visual indicia is in the form of faint dashed boxes and dashed lines representing panels and cables that are shown as solid lines in FIG. 4B, which shows the next level in the hierarchy. Rather than using dashed lines, however, some embodiments may use different colors or other techniques for displaying such next level indicia. In illustrative embodiments, this next level indicia preferably is in the format substantially as shown in another 2D document—i.e., it is at least a schematic outline of the actual component it emulates from the other 2D document 16. In preferred embodiments, this next level indicia is laid out substantially as it is laid out in the next level, in which it is not dashed or otherwise indicated as next level indicia.

Such next level visual indicia thus represents the specified components on the next level down in the hierarchy 18. Although not shown, the 2D document 16 also or alternatively may have similar prior level indicia showing information about a 2D document 16 in the level above it (e.g., components on that upper level 2D document).

Figure 4F:
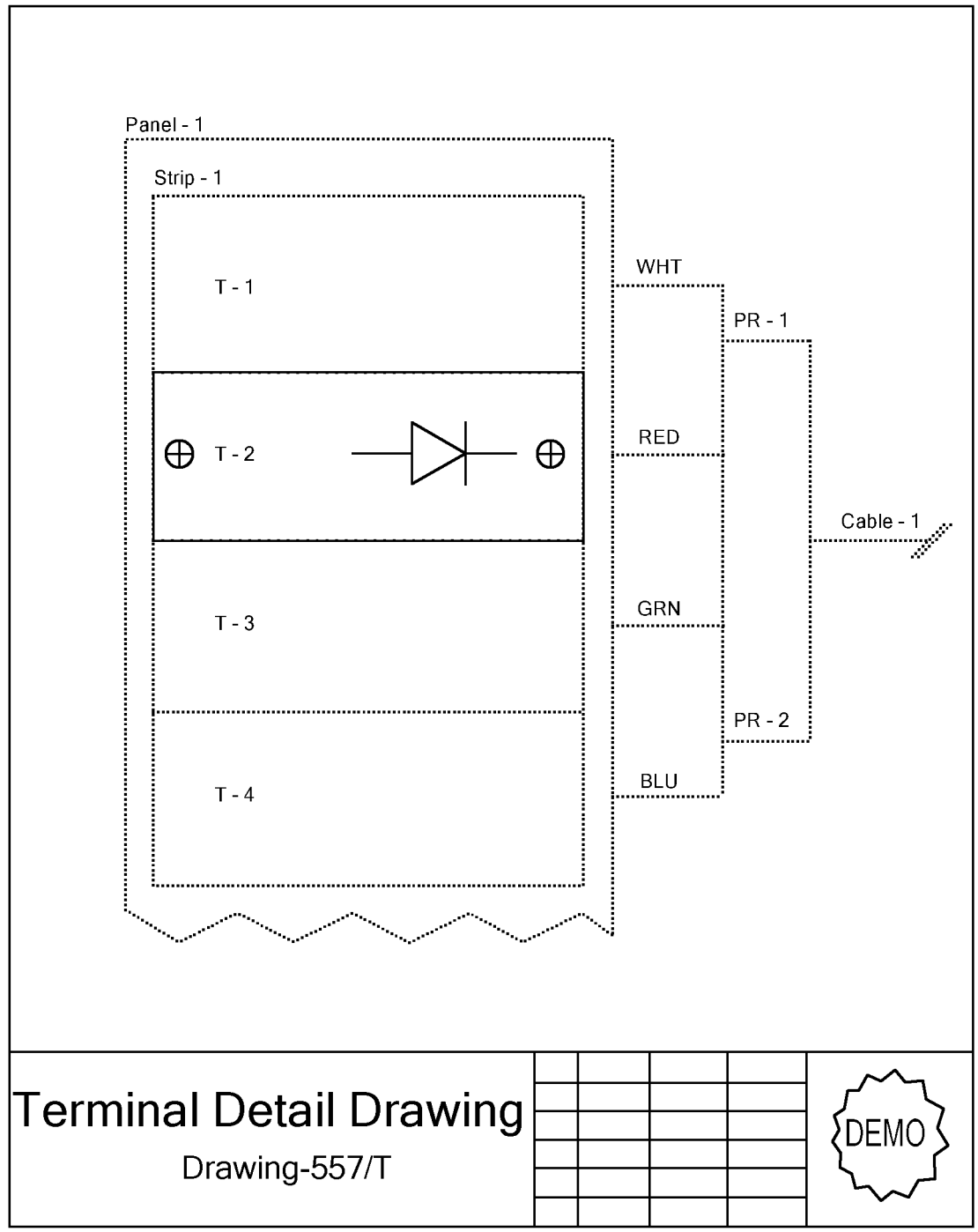
FIG. 4F schematically shows an example of a 2D document at a sixth, bottom hierarchical level that is beneath the fifth hierarchical level.

In a manner similar to FIG. 4A, the 2D document 16 of FIG. 4B has solid lines representing the specific panels and cables of this 2D document 16, and other 2D document visual indicia in the form of dashed boxes and lines representing components in the next related 2D document 16. This pattern repeats through FIG. 4C, which shows a 2D document with two panels, FIG. 4D, which shows a 2D document 16 having specific panel and strips, FIG. 4E, which has a 2D document with more details of the strips within the specific panel, and ends at the lowest level 2D document 16, FIG. 4F, showing circuitry, which, in this case, includes a diode and other items within one of the strips.

Those skilled in the art can develop the hierarchical rules using any of a number of techniques, such as visual programming or other programming processes. FIGS. 5A-5D schematically illustrate a simplified method for developing the rules for a set of 2D documents 16 in a hierarchy 18 in accordance with illustrative embodiments of the invention. In this example, a programmer or other designer uses a graphical user interface, linked to underlying logic, to assign rules interconnecting 2D documents 16 in the hierarchy 18.

Figure 5A:
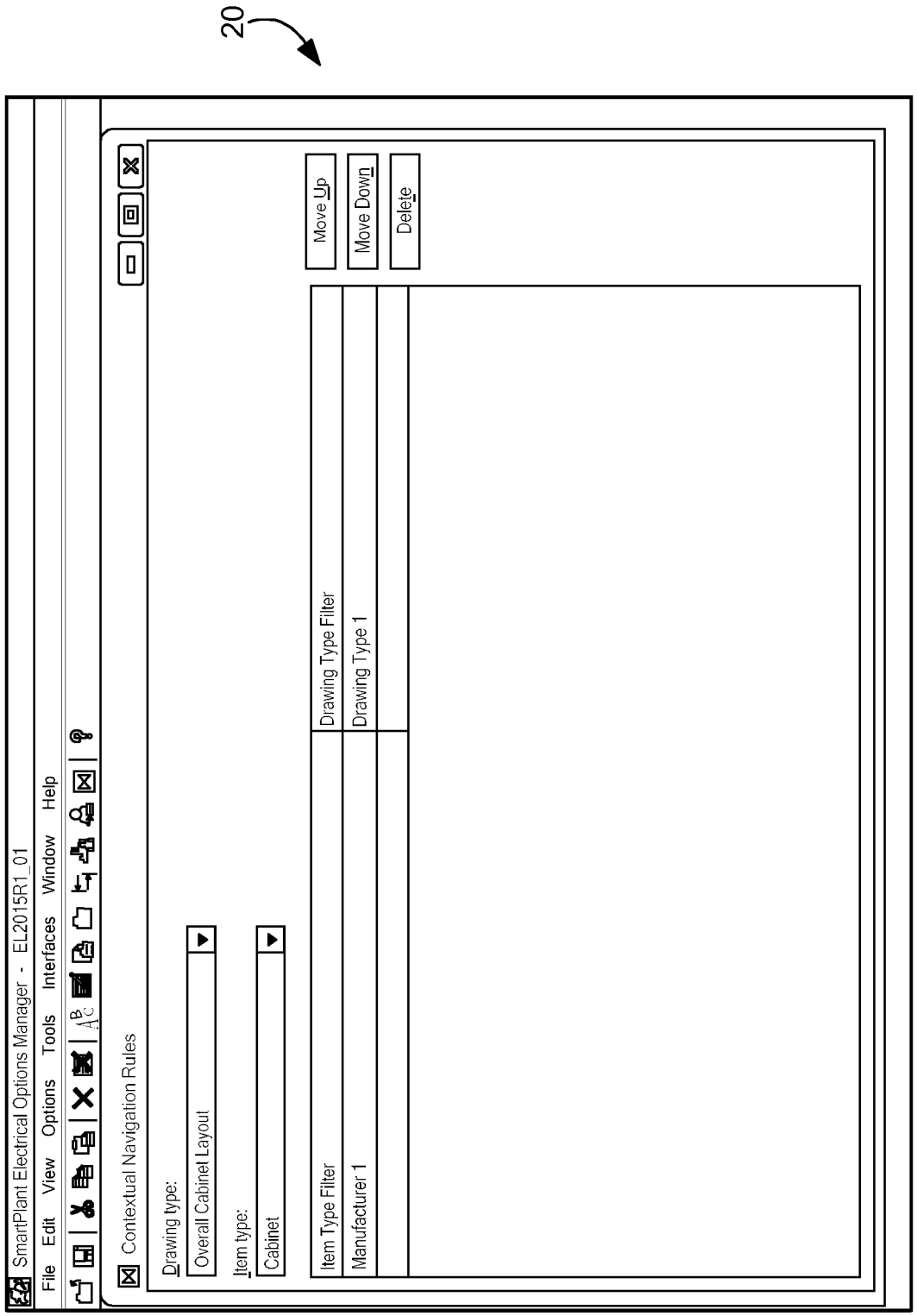
FIGS. 5A-5D schematically show a process, and graphical user interfaces for that process, for producing attribute based rules in accordance with illustrative embodiments of the invention.

FIG. 5A schematically shows a rules graphical user interface 20 ("rules UI 20") that enables a rules maker (e.g., a user or logic) to formulate the rules hierarchically interconnecting the various 2D documents 16 in this example. Specifically, the rules UI 20 has a number of fields and buttons that cooperate with underlying logic for defining the 2D document relationships. Each of these fields may have a pre-populated drop down menu, or may be editable to write the selection directly into the field. Of course, it should be noted that the method illustrated by the rules UI 20 is but one of any of a wide variety of techniques that can be used to define attributes and the hierarchy 18. It also should be noted that these graphical user interfaces also may refer to rules as "filters."

As discussed in greater detail above and illustrated by FIGS. 4A-4F, each drawing may have a plurality of different components, and each of those components may have attributes. FIGS. 5A-5D schematically also enable the rules maker to make a rule for each component. To that end, FIG. 5A schematically shows the rules UI 20, which assigns rules to a 2D document and its components in accordance with illustrative embodiments of the invention. To that end, the rules UI 20 has a Drawing Type field that, as its name suggests, enables the rules maker to define a document type for the 2D document 16. The rules maker thus may select from a drop-down menu listing various selections. For example, the drawing type of the 2D document 16 of FIG. 4A is "Overall Cabinet Layout," which the rules maker selected in this example.

The rules maker then selects an item over which a user may be hovering from the "Item Type" drop-down menu. In this example, if the user hovers the cursor over the cabinet in FIG. 4A, then the rule of the next block in the rules UI 20 is applied. Specifically, the next large block of the rules UI 20 has two columns: "Item Type Filter" column for specifying a possible item type (i.e., an attribute of the item), and a "Drawing Type Filter" column for specifying the next 2D document 16 to access if the Item Type Filter is true. In this example, if the item type of the Cabinet is "Manufacturer 1," then the user is directed to "Drawing Type 1." Presumably, the Drawing Type 1 is the specific layout of the cabinet by Manufacturer 1.

Figure 5B:
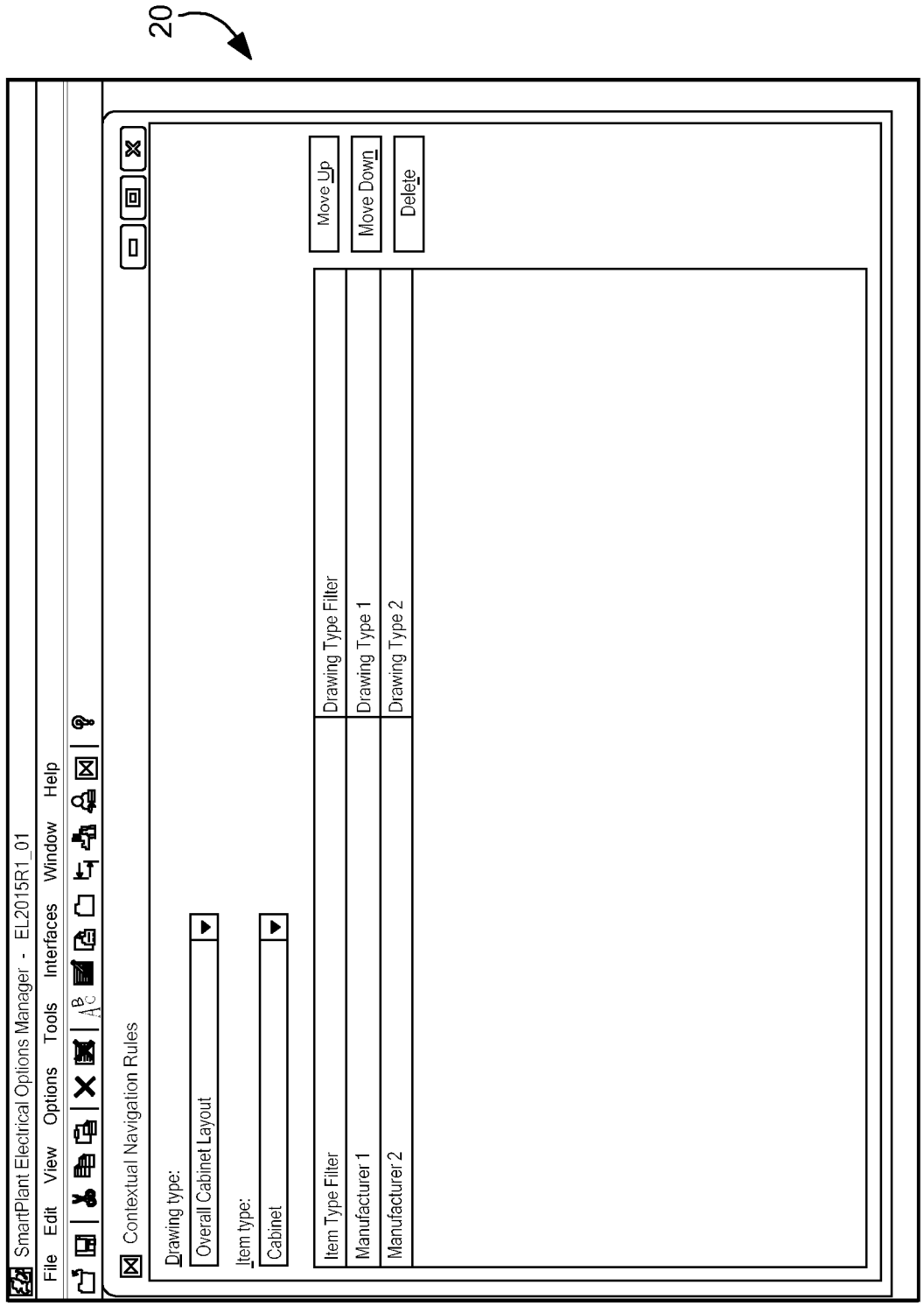

This large block may have a list of different rules for Item Type Cabinet. FIG. 5B shows another Item Type attribute, where if the Item Type is Manufacturer 2, then the user is directed to "Drawing Type 2." Presumably, the Drawing Type 2 is the specific layout of the cabinet by Manufacturer 2.

This list can be expansive, and rules can take multiple attributes into account (e.g., using Boolean expressions) when determining the next appropriate 2D document 16 in the hierarchy. The rules maker should be careful, however, not to define conflicting rules. For example, if another rule would direct access to a Drawing Type 3 if the Manufacturer were Manufacturer 1 AND the model were Model 1, then there would be a conflict. Those skilled in the art can specific more detailed rules to provide priority in a conflict or in other circumstances (e.g., access control for different security levels based on the user's access rights).

Figure 5C:
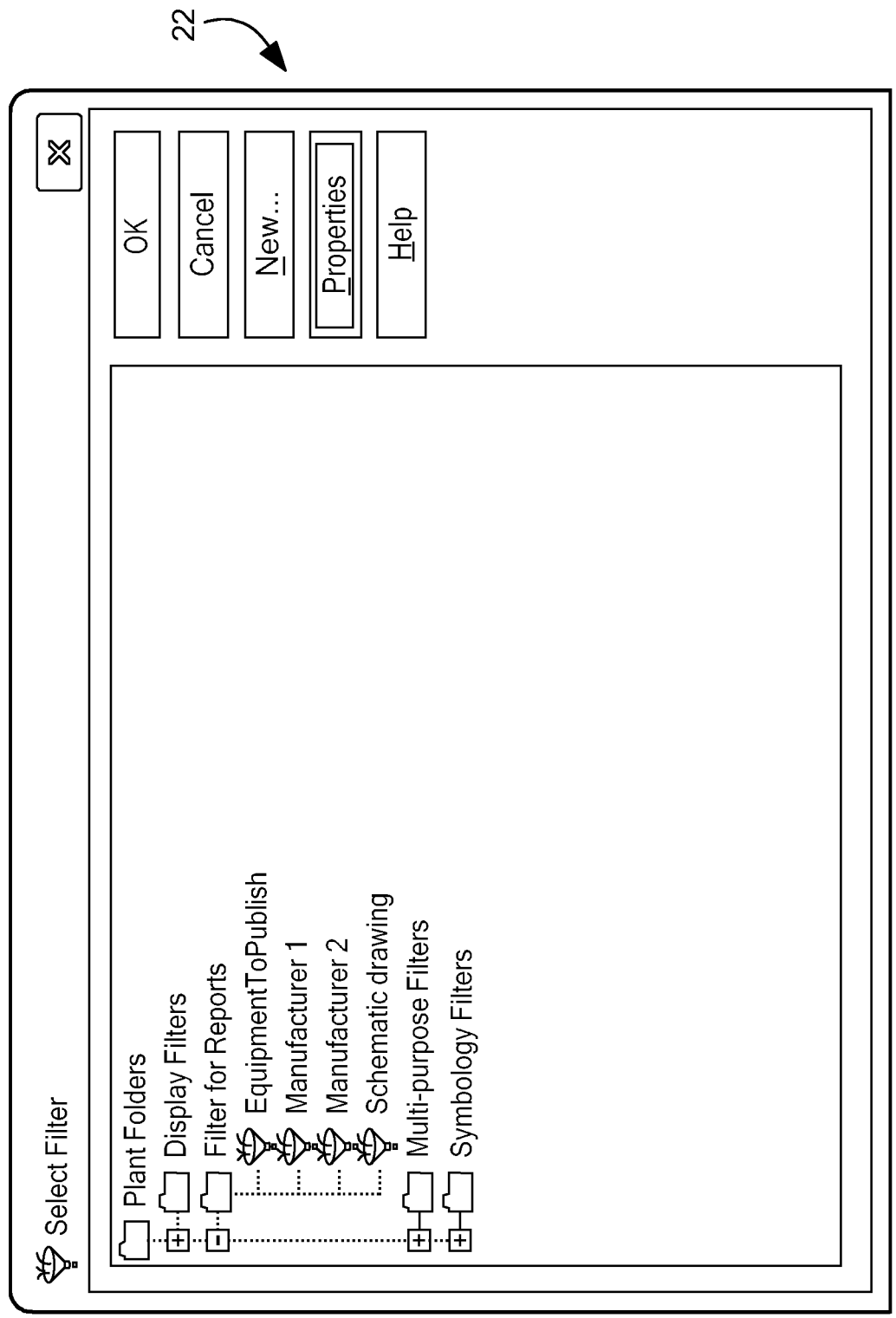
Figure 5D:
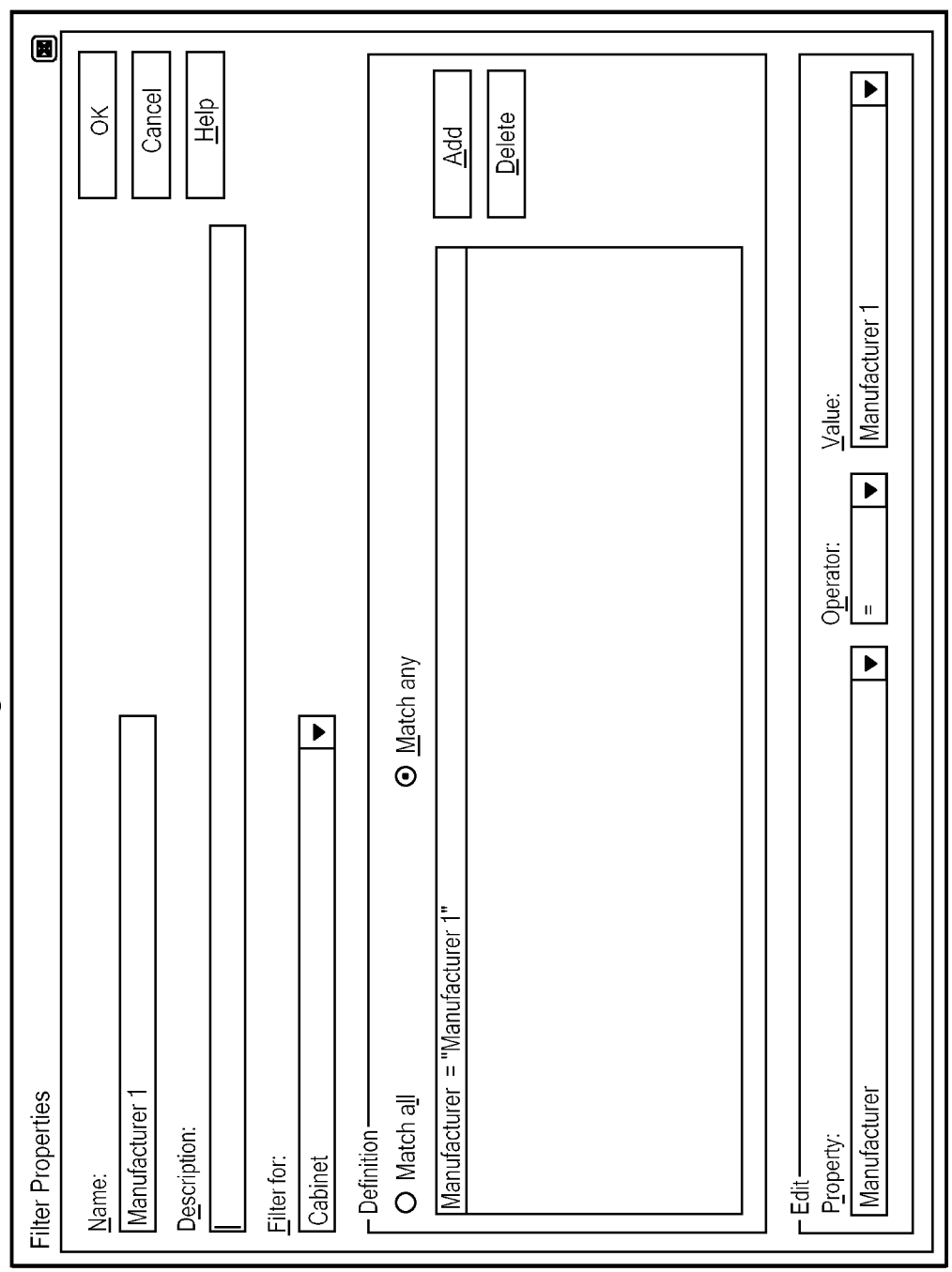

Those skilled in the art may define the specific attributes of a 2D document 16, such as "Manufacturer 1," in any of a variety of different manners. FIGS. 5C and 5D schematically show one way of doing so using two definition graphical user interfaces ("definition UIs 22"). For example, the definition UI 22 of FIG. 5C lists possible attributes of the 2D document 16, while definition UI 22 of FIG. 5D enables the rules maker to name and define specific attributes to be used by the rules UI 20 of FIGS. 5A and 5B. In the example shown in FIG. 5D, the rules maker named this attribute "Manufacturer 1," which is added to the definition UI 22 list of FIG. 5C. The system automatically knows that this attribute is for the cabinet, which thus is greyed out in FIG. 5D.

Moreover, in the Edit field, the definition UI 22 defines the manufacturer variable, to be considered in the rules of FIGS. 5A and 5B, as being at least Manufacturer 1. A similar process using the definition UI 22 of FIG. 5D also was performed for Manufacturer 2. Thus, as noted above, the rules maker simply writes the name of the attribute in the rules UI 20 of FIGS. 5A and 5B, which was pre-defined by the definition UIs 22 of FIGS. 5C and 5D.

Figure 6:
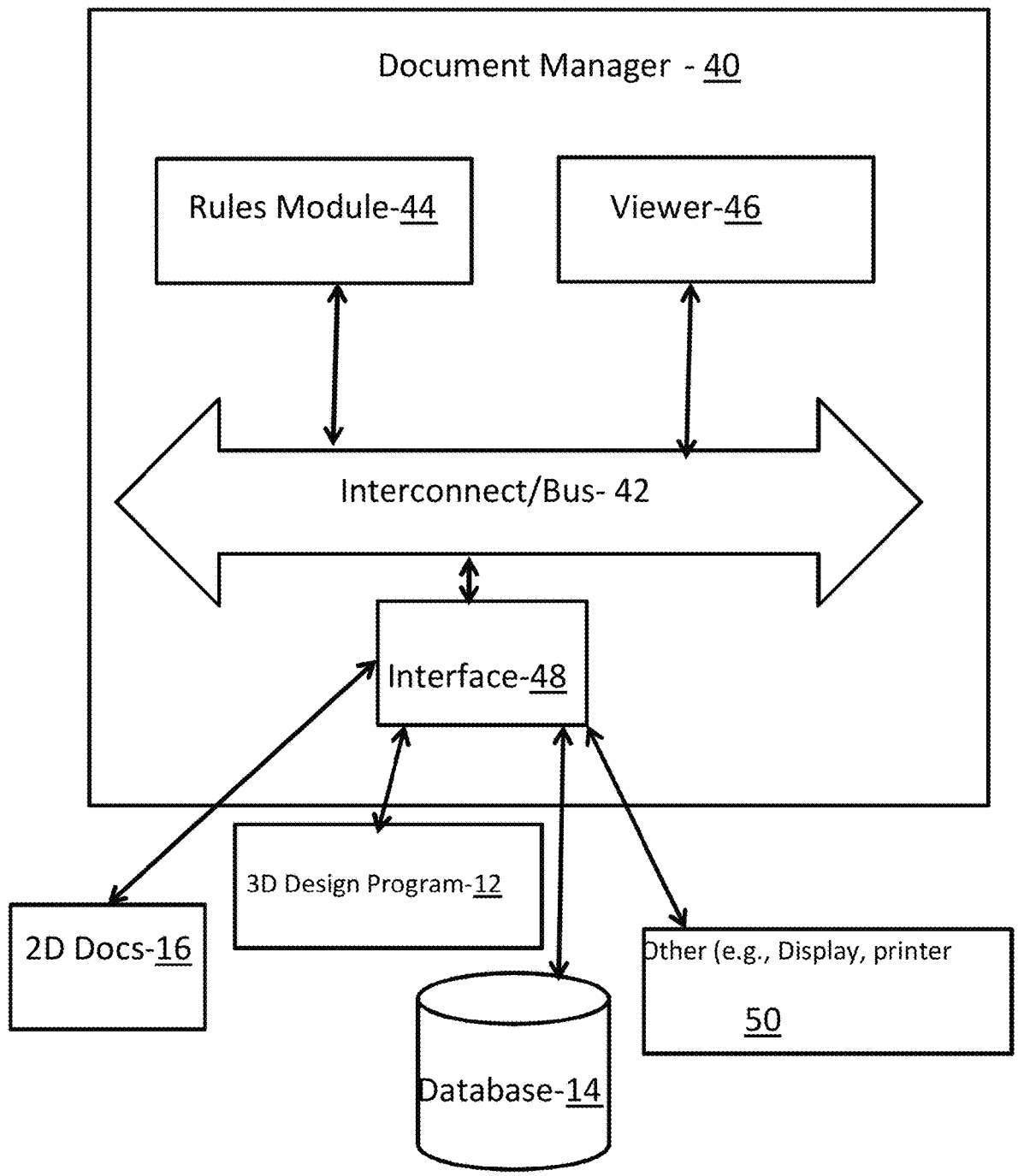
FIG. 6 schematically shows a document manager configured in accordance with illustrative embodiments, and its interaction with 3D design program and other related components.

The rules maker, logic, and/or other entity may use a document manager 40 to form and manage the hierarchy 18 in illustrative embodiments. To that end, FIG. 6 schematically shows a block diagram of the document manager 40 configured in accordance with illustrative embodiments of the invention. This figure also shows the interaction of the document manager 40 with other systems, such as the various prior modules discussed above. In this drawing, the document manager 40 is implemented by a plurality of separate but cooperating functional components or modules. For simplicity, FIG. 6 shows only a few of those components or modules.

Each of these components is operatively connected by any conventional interconnect mechanism. FIG. 6 simply shows a bus 42 communicating each the components. Those skilled in the art should understand that this generalized representation can be modified to include other conventional direct or indirect connections. Accordingly, discussion of a bus 42 is not intended to limit various embodiments.

Indeed, it should be noted that FIG. 6 only schematically shows each of these components. Those skilled in the art should understand that each of these components can be implemented in a variety of conventional manners, such as by using hardware, software, or a combination of hardware and software, and across one or more other functional and/or hardware components. For example, a rules module 44 (discussed below) may be implemented using a plurality of microprocessors executing firmware. As another example, the rules module 44 may be implemented using one or more application specific integrated circuits (i.e., "ASICs") and related software, or a combination of ASICs, discrete electronic components (e.g., transistors), and microprocessors. Accordingly, the representation of the rules module 44 and other components in a single box of FIG. 6 is for simplicity purposes only. In fact, in some embodiments, the document manager 40 of FIG. 6 is distributed across a plurality of different machines—not necessarily within the same housing or chassis, and those machines may be spaced far apart as a distributed logic system.

It should be reiterated that the representation of FIG. 6 is a significantly simplified representation of the document manager 40. Those skilled in the art should understand that such a device has many other physical and functional components, such as central processing units, other processing modules, a display device, and short-term memory. Accordingly, this discussion is in no way intended to suggest that FIG. 6 represents all of the elements of the document manager 40.

To accomplish its functions, the document manager 40 has the above noted rules module 44, which generates and applies the rules that produce the hierarchy 18. Among other things, the rules module 44 may perform functionality described above with regard to FIGS. 5A-5D, and functionality described below with regard to FIG. 7. The rules module 44 may be configured to perform other functions, not discussed, that enhance the functionality of the overall document manager 40. As discussed above, those skilled in the art can select the appropriate physical or logical apparatus(es) to accomplish those functions.

The document manager 40 also includes a viewer 46 that permits a user to access 2D documents 16 in the hierarchy 18, as well as interact with other functional elements, such as the rules module 44. Among other things, the viewer 46 may have functional logic that communicates with corresponding logic to perform the various functions discussed herein. For example, the viewer 46 may have a microprocessor or ASIC. In addition, the viewer 46 (and/or the rules module 44) may have a display device. The viewer 46 also may perform its functions in accordance with the methods described with above and below.

To interact with external devices, the 2D document manager 40 has an interface 48 (e.g., a hardware interface and/or logical communications module), thus permitting the viewer 46 and rules module 44, among other things, to communicate with the 3D design program 12, the database 14, the 2D documents 16 (e.g., in memory on some machine either internal or external to the document manager 40), and other devices 50 (e.g., display devices, printers, other document managers 40, etc.).

Figure 7:
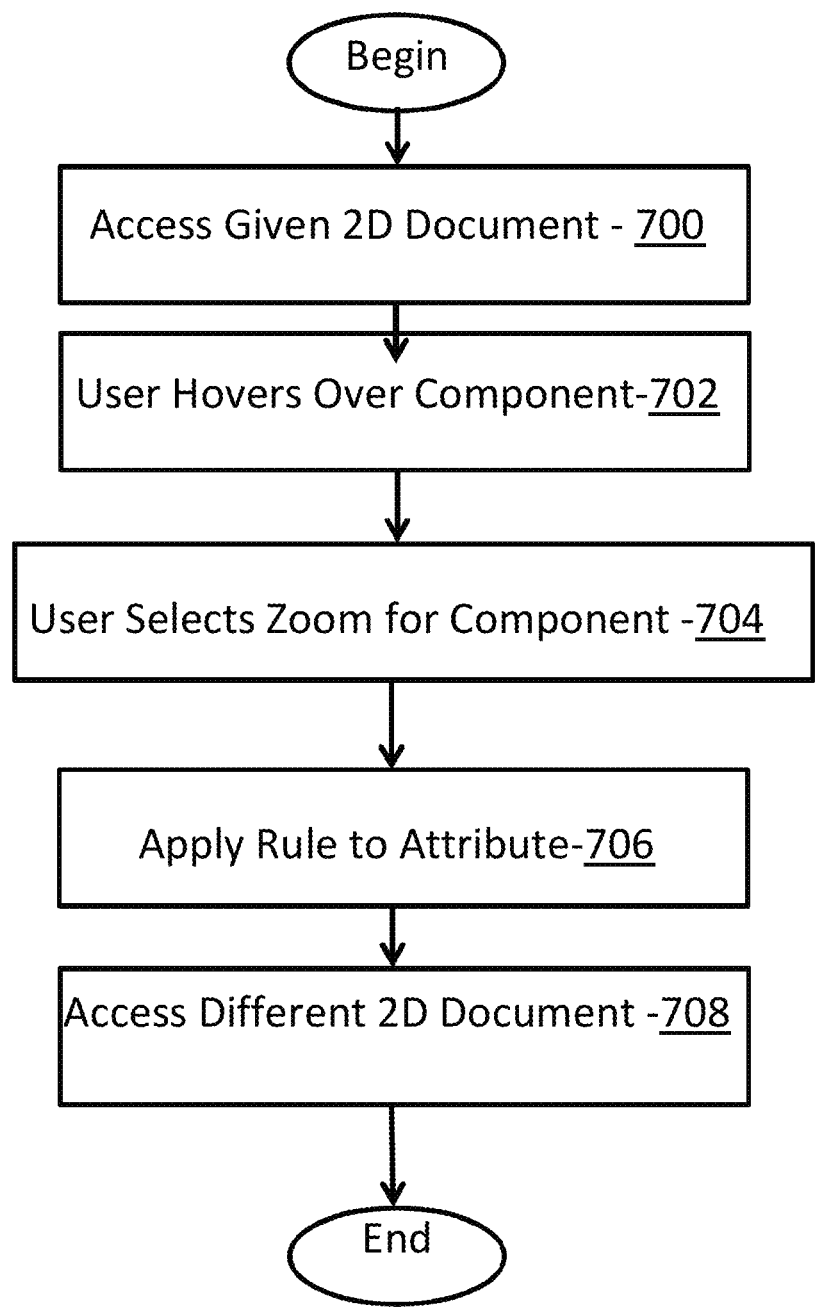
FIG. 7 shows a process of navigating between 2D documents in a hierarchy in accordance with illustrative embodiments of the invention.

FIG. 7 shows a process used by the document manager 40 to navigate between 2D documents 16 in a hierarchy 18 in accordance with illustrative embodiments of the invention.

It should be noted that this process may be considered to be simplified from a longer process that normally would be used to navigate between the 2D documents 16. Accordingly, the process of navigating between the different 2D documents 16 may have many other steps that those skilled in the art likely would use. In addition, some of the steps may be performed in a different order than that shown, or at the same time. Those skilled in the art therefore can modify the process as appropriate.

The process of FIG. 7 begins at step 700, in which a user accesses a given 2D document 16. Accordingly, using the viewer 46, a user may access the 2D document 16 shown in FIG. 4A. For example, the viewer 46 may automatically enable a user to select from a list of document options displayed to the user on a display device, or conduct a 2D document search on a local search engine. In response, the viewer 46 may send a document retrieval call to logic managing a persistent storage device (not shown) storing the 2D document 16, which delivers it to the viewer 46 for display on the display device.

Of course, illustrative embodiments may use other conventional techniques to access the 2D documents 16 in some manner through the interface 48. For example, the viewer 46 may call logic that retrieves the logical container holding a listing of the components that make up the 2D document 16, retrieve the attribute information from the database 14, and then perform other actions, such as displaying the objects on a display device.

Next, the user may select one component of the given 2D document 16, such as by causing a cursor to hover over one component in the 2D document 16 (the "hovered component," step 702), and select a zoom function while hovering over the hovered component (step 704). As shown, in this example, the user may access any of a plurality of other 2D documents 16, in other hierarchical levels, based on the hovered component when the zoom command is selected. Of course, logic can correlate the position of the cursor with components in the 2D document 16. In this example, the user hovers their cursor over Panel 1 of FIG. 4B and selects a zoom-in function, which ultimately will bring that user to a specific next 2D document 16 as discussed below.

In response, the rules module 44 applies the rule to the specific attribute of the hovered component, which determines the next 2D document 16 to access in the hierarchy 18 (step 706). This rule may be as simple as an if-then statement in the below pseudocode:

```
Get list of rules (from rule manager) specific to
the Item / Component type that is being hovered
    For each Rule
    //Evaluate the Rule with the hovered component//
    If pass, then search the appropriate document in
database, of type that was defined for this rule, that
contain the hovered component, retrieve the appropriate
document, and show the document.
    Next
```

In that example, if the hovered component is a first type of subcomponent, then the rules module 44 selects a first 2D document 16. Alternatively, if the hovered component is a second type of subcomponent, then the rules module 44 selects a second 2D document 16. These two different 2D documents 16 preferably are on a lower level than that of the 2D document 16 having the hovered component.

In other embodiments, however, the rule may be more complex and involve a plurality of variables using a specific formula, such as one using Boolean logic. For example, the below pseudocode may be used:

```
{var1, var2 and var3 are the possible variables}
if var 1 and var 2,
    then go to document1;
    else
if var1 and var 3,
    then go to document 2;
    else
if var1 and var2 and var2,
    then go to document 3;
    else
if var1 or var2,
    then go to document 4;
    else
if var1 or var 3,
    then go to document 5;
```

In this example, the rules module 44 uses more complicated Boolean operators to determine the next appropriate 2D document 16 to access. Those 2D documents 16 in this example are different. In some embodiments, however, different expressions or equations may yield the same next 2D document 16. Of course, it should be noted that these rules are illustrative and not intended to limit various other embodiments. Accordingly, those skilled in the art can form different rule types to accomplish various other embodiments of the invention.

The process concludes at step 708, in which the viewer 46 accesses the next 2D document 16, as determined by step 706, through the interface 48. In other words, the user accesses a different 2D document 16 as a function of the application of the attribute based rule to one or more attributes. It should be noted that multiple combined rules may, in some instances, be considered a single rule.

This process can repeat from the top of the hierarchy 18 to the bottom of the hierarchy 18. Accordingly, using the example of FIGS. 4A-4F, the user can traverse from the 2D document 16 in FIG. 4A and conclude at the 2D document 16 at FIG. 4F. As noted above, although the 2D documents 16 used in the examples are schematic drawings, the 2D documents 16 may also include other types of 2D documents 16, such as spreadsheets, manuals, and reports.

Before the user reaches the 2D document 16 at FIG. 4F, however, somebody using the system, or other logic, may alter one of the attributes of a 2D document 16 the user has not used to access a next 2D document 16. For example, a user accessing another 2D or 3D document may change attribute data of some part of the system in question. This immediately updates the database 14, which changes attributes across all the 2D documents 16. If that happens, then the route taken from the top to the bottom of the hierarchy 18 may seamlessly change to another set of 2D documents 16.

For example, a given 2D document 16 may have a circuit breaker rated for no more than 100 volts. If that voltage attribute is not altered, then the next 2D document 16 may be a first 2D document 16 relating to low voltage components. If, however, the rating is changed to 2000 volts before the user applies the rule to the attribute at that point (i.e., step 706 of FIG. 7), then when the user zooms on that circuit breaker, the next 2D document 16 may include high voltage components. Accordingly, the hierarchy 18 is dynamically changeable based on the properties and contexts of the various 2D documents 16 and components.

Moreover, if at step 702 the user did not hover over a specific component before zooming (step 704), then the rules module 44 may apply the rule(s) (step 706) so that the user does not jump to another 2D document 16. Alternatively, the rules module 44 may apply the rule to send the user to some other 2D document 16 based on any of a number of criteria/attributes of the entire 2D document 16. For example, that criteria may be based on the attribute(s) of the 2D document 16 as a whole (e.g., the type of component and version number of the 2D document), one or more attributes of selected components in the 2D document 16, or a combination of the 2D document general attributes and the component attributes.

Although this process is discussed as traversing downwardly in the hierarchy 18, illustrative embodiments also may apply this process to a user traversing upwardly in the hierarchy 18. For example, the user may apply a zoom (out) command when hovering over a specific component (step 702), which causes the rules module 44 to apply attributes of the 2D document 16 as a whole or some set of 2D document attributes (e.g., related to the components) to zoom out to a 2D document 16 in another level above the current level. Those skilled in the art can select the appropriate rules and criteria for making those moves between 2D documents 16.

In a manner similar to traversing down, the hierarchy 18 may change while traversing upwardly, thus causing the path to the top to change in a corresponding manner. Alternatively, while traversing down the hierarchy 18, the rules module 44, viewer 46, or other functional module may keep a log of the path taken from the top level 2D document 16 to the bottom level 2D document 16. Logic within the document manager 40 thus may permit the user to traverse back to the top of the hierarchy 18 through the same set of 2D documents 16 used to traverse downwardly. This functionality may be called by a user selectable setting, an automatic setting, or based on some other criteria as required by the system or application.

Some embodiments may show icons of the entire hierarchy (e.g., similar to FIG. 3A), thus enabling the user to jump to specific 2D documents 16 without requiring traversal though all intervening 2D documents 16. Such embodiments, however, may act as an effective "bread-crumb" trail to guide the user through the hierarchy.

Accordingly, illustrative embodiments maintain the relationships of the 2D documents 16. In contrast, prior art 3D design systems for capital projects 10 suffered from a fundamental technical problem—they had no mechanism for interrelating 2D documents 16 they produced. At times, this technical problem substantially slowed down the overall project and increased costs. Illustrative embodiments solve that technical problem, thus improving the processing of the 3D design system itself. Specifically, rather than generating many unrelated 2D documents 16, illustrative embodiments form a tightly connected hierarchy 18 that permits a user to easily locate and use 2D documents 16 of interest while developing a large-scale capital project 10. When traversing in either direction in the hierarchy 18, a 2D document 16 may have a one-to-one relationship with another 2D document 16, or a one-to-many relationship with other 2D documents 16, thus enhancing overall functionality and usefulness of the 2D documents 16 generated by the 3D design program 12.

Users of the 3D design systems implementing various embodiments thus may implement capital project specific processes more rapidly than before. For example, after easily locating and processing the appropriate 2D document, a user or other person may implement a structural change or transformation to the capital project 10 (e.g., change a circuit breaker).

Various embodiments of the invention may be implemented at least in part in any conventional computer programming language. For example, some embodiments may be implemented in a procedural programming language (e.g., "C"), as a visual programming process, or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the methods described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many in computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A computer-implemented method of managing a large capital project, the method comprising:
   obtaining access to a plurality of 2D capital project documents ("2D documents") that were produced using project data generated by a 3D design program used for the capital project, the 2D documents being stored in a digital storage device and representing a physical aspect of the capital project, the plurality of 2D documents logically related through a hierarchy that at least in part is defined by a plurality of attribute based rules;
   accessing a given 2D document of the plurality of 2D documents, the given 2D document being in a given hierarchical level;

receiving, from a user from within the given 2D document, selection of a component of the given 2D document ("selected component"), the selected component representing an object from the capital project, and having a given attribute;

applying at least one of the attribute-based rules to the given attribute of the given 2D document selected component;

determining, as a function of applying the at least one attribute-based rule, which different 2D document in the plurality of 2D documents in another hierarchical level to access; and accessing the different 2D document as a function of the application of the at least one attribute based attribute-based rule to the given attribute of the selected component.

2. The method as defined by claim 1 wherein the set of attribute-based rules dynamically changes the hierarchy of the given document if the at least one associated given attribute changes.

3. The method as defined by claim 2 wherein the attribute-based rules are configured so that if the at least one given attribute is a first attribute, then the different document is a first document of the plurality of 2D documents, the attribute-based rules further being configured so that if the at least one given attribute is a second attribute that is different from the first attribute, then the different document is a second document of the plurality of 2D documents.

4. The method as defined by claim 1 wherein each 2D document within the plurality of 2D documents has an associated attribute, the given attribute being an associated attribute for the given 2D document, and the position, within the hierarchy, of each of the plurality of 2D documents is defined by its associated attribute.

5. The method as defined by claim 4 wherein the different 2D document is at a lower position within the hierarchy than the given 2D document, and the associated attribute for the given document comprises a level of detail for the component, and the associated attribute for the different 2D document indicates a finer level of detail of the component.

6. The method as defined by claim 5 wherein the given 2D document includes shadow indicia outlining at least a portion of indicia of a next level component in a 2D document of another hierarchical level.

7. The method as defined by claim 1 wherein the given 2D document has a plurality of given attributes, applying at least one of the attribute-based rules comprises applying the attribute based rules to the plurality of given attributes.

8. The method as defined by claim 1 wherein the given 2D document includes first indicia representing a first given component of the capital project, the given attribute being related to the first given component.

9. The method as defined by claim 1 wherein:
the given 2D document includes first indicia representing a first given component of the capital project, the given 2D document further including second indicia representing a second given component of the capital project, the given attribute being related to the first given component or the second given component,
the different 2D document being a first different 2D document if the first given component is applied to the rules,
the different 2D document being a second different 2D document if the second given component is applied to the rules,
the first different 2D document and second different 2D document being not the same 2D document.

10. The method as defined by claim 1 further comprising changing the given attribute of the selected component, changing comprising updating an attribute database associated with the plurality of 2D documents and the 3D design program.

11. The method as defined by claim 1 further comprising transforming a physical component represented in one of the 2D documents in the hierarchy after accessing the given 2D document.

12. An apparatus for managing a large capital project using project data from a 3D design program to generate a plurality of 2D capital project documents relating to the capital project ("2D documents") and representing a physical aspect of the capital project, the apparatus comprising:
an interface to access the plurality of 2D documents, the plurality of 2D documents being logically related through a hierarchy that at least in part is defined by a plurality of attribute-based rules;
a viewer operably coupled with the interface, the viewer being configured to access a given 2D document of the plurality of 2D documents, the given 2D document being in a given hierarchical level;
the viewer further configured to receive, from a user from within the given 2D document, selection of a component of the given 2D document ("selected component"), the selected component representing an object from the capital project, and having a given attribute;
a rules module operably coupled with the viewer, the rules module being configured to apply at least one of the attribute-based rules to the given attribute of the selected component, the rules module also being configured to determine, as a function of applying the at least one attribute-based rule, which different 2D document in the plurality of 2D documents in another hierarchical level to access,
the viewer also being configured to access the different 2D document as a function of the application of the at least one attribute-based rule to given attribute of the selected component.

13. The apparatus as defined by claim 12 further comprising a rule generator to produce the plurality of attribute-based rules.

14. The apparatus as defined by claim 12 wherein the set of attribute-based rules dynamically changes the hierarchy of the given document if the at least one associated given attribute changes.

15. The apparatus as defined by claim 12 wherein the plurality of 2D documents includes one or more of schematics, spreadsheets, drawings, reports, and manuals.

16. The apparatus as defined by claim 12 wherein the viewer is coupled with a display device, the viewer controlling the display device to display the given 2D document on the display device.

17. The apparatus as defined by claim 16 wherein the viewer displays the given 2D document on the display device so that the 2D document includes shadow indicia outlining at least a portion of indicia of a next level component in a 2D document of another hierarchical level.

18. The apparatus as defined by claim 12 wherein the rules module is configured to apply the attribute-based rules to more than one of the plurality of given attributes.

19. The apparatus as defined by claim 12 wherein:
the given 2D document includes first indicia representing a first given component of the capital project, the given 2D document further including second indicia representing a second given component of the capital project, the given attribute being related to the first given component or the second given component, the different 2D document being a first different 2D document if the first given component is applied to the rules, the different 2D document being a second different 2D document if the second given component is applied to the rules, the first different 2D document and second different 2D document being not the same 2D document.

20. A computer program product for use on a computer system for managing a large capital project, the computer program product comprising a tangible, non-transient computer usable medium having computer readable program code thereon, the computer readable program code comprising:

program code for obtaining access to a plurality of 2D capital project documents ("2D documents") that were produced using project data generated by a 3D design program for the capital project, the plurality of 2D documents being logically related through a hierarchy that at least in part is defined by a plurality of attribute-based rules, the plurality of 2D documents representing a physical aspect of the capital project;

program code for accessing a given 2D document of the plurality of 2D documents, the given 2D document having a given attribute and being in a given hierarchical level;

program code for receiving, from a user from within the given 2D document, selection of a component of the given 2D document ("selected component"), the selected component representing an object from the capital project, and having a given attribute;

program code for applying at least one of the attribute-based rules to the given attribute of the given 2D document;

program code for determining, as a function of applying the at least one attribute-based rule, which different 2D document in the plurality of 2D documents in another hierarchical level to access; and program code for accessing the different 2D document as a function of the application of the at least one attribute-based rule to the given attribute of the selected component.

21. The computer program product as defined by claim 20 wherein the set of attribute-based rules dynamically changes the hierarchy of the given document if the at least one associated given attribute changes.

22. The computer program product as defined by claim 21 wherein the attribute-based rules are configured so that if the at least one given attribute is a first attribute, then the different document is a first document of the plurality of 2D documents, the attribute based rules further being configured so that if the at least one given attribute is a second attribute that is different from the first attribute, then the different document is a second document of the plurality of 2D documents.

23. The computer program product as defined by claim 20 wherein the plurality of 2D documents includes one or more of schematics, spreadsheets, drawings, reports, and manuals.

24. The computer program product as defined by claim 20 wherein the program code for accessing a given 2D document comprises program code for displaying the given 2D document on a display device.

25. The computer program product as defined by claim 24 further comprising program code for causing the given 2D document to include shadow indicia outlining at least a portion of indicia of a next level component in a 2D document of another hierarchical level.

26. The computer program product as defined by claim 20 wherein the given 2D document has a plurality of given attributes, the program code for applying at least one of the attribute-based rules comprises program code for applying the attribute based rules to two or more of the plurality of given attributes.

27. The computer program product as defined by claim 20 further comprising program code for changing the given attribute of the selected component, the program code for changing comprising program code for updating the given attribute in an attribute database associated with the plurality of 2D documents.

* * * * *

UNITED STATES PATENT AND TRADEMARK OFFICE
CERTIFICATE OF CORRECTION

| | |
|---|---|
| PATENT NO. | : 11,037,253 B2 |
| APPLICATION NO. | : 15/089921 |
| DATED | : June 15, 2021 |
| INVENTOR(S) | : Gil Ziny |

Page 1 of 1

It is certified that error appears in the above-identified patent and that said Letters Patent is hereby corrected as shown below:

In the Claims

At Column 15, Claim number 1, Line numbers 14 and 15, please replace "attribute based attribute-based" with --attribute-based--

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*